US012811414B2

(12) United States Patent
Yin

(10) Patent No.: US 12,811,414 B2
(45) Date of Patent: Nov. 24, 2026

(54) INTEGRATED CIRCUIT AND BATTERY SYSTEM

(71) Applicant: Zgmicro Wuxi Corporation, Wuxi Jiangsu (CN)

(72) Inventor: Hang Yin, Wuxi (CN)

(73) Assignee: ZGMICRO WUXI CORPORATION, Wuxi (CN)

( * ) Notice: Subject to any disclaimer, the term of this patent is extended or adjusted under 35 U.S.C. 154(b) by 578 days.

(21) Appl. No.: 18/385,230

(22) Filed: Oct. 30, 2023

(65) Prior Publication Data

US 2024/0356344 A1 Oct. 24, 2024

(30) Foreign Application Priority Data

Oct. 31, 2022 (CN) ......................... 202211365572.0

(51) Int. Cl.

| | |
|---|---|
| ***H02J 7/54*** | (2026.01) |
| ***H01M 10/42*** | (2006.01) |
| ***H01M 50/51*** | (2021.01) |
| ***H02J 7/60*** | (2026.01) |
| ***H02J 7/80*** | (2026.01) |
| ***H02J 7/96*** | (2026.01) |

(52) U.S. Cl.

CPC ........... *H02J 7/54* (2026.01); *H01M 10/4264* (2013.01); *H01M 50/51* (2021.01); *H02J 7/60* (2026.01); *H02J 7/80* (2026.01); *H02J 7/96* (2026.01); *H01M 2010/4271* (2013.01)

(58) Field of Classification Search

CPC ........ H02J 7/54; H02J 7/60; H02J 7/80; H02J 7/96; H02J 7/00; H01M 2010/4271

USPC .......................................................... 320/118

See application file for complete search history.

(56) References Cited

U.S. PATENT DOCUMENTS

2011/0062917 A1 3/2011 Shiu et al.
2011/0254515 A1* 10/2011 Hara ......................... H02J 7/64 320/167
2018/0152027 A1 5/2018 Peng et al.

FOREIGN PATENT DOCUMENTS

CN 103606899 A 2/2014
CN 109802466 A 5/2019

OTHER PUBLICATIONS

Office Action of CN Application No. 202211365572.0 dated May 27, 2026 and English translation, 15 pages.

* cited by examiner

*Primary Examiner* — Toan C Ly

(74) *Attorney, Agent, or Firm* — MUNCY, GEISSLER, OLDS & LOWE, P.C.

(57) ABSTRACT

An integrated circuit (a.k.a., semiconductor chip or chip) and a battery system are described. The chip comprises: a balanced discharge circuit including: a plurality of switches each switch coupled to two terminals of one of a plurality of battery cells coupled in series through a resistor outside the chip; and a control circuit coupled to two terminals of each of the switches, and configured to detect a voltage of each of the battery cells when all the switches are turned off, and then determine whether to control each of the switches to be turned on according to the detected voltage of corresponding battery cell. Thus, the chip in the present invention can accurately detect a voltage of each of the battery cells, facilitate heat dissipation, and increase an upper limit of a balanced discharge current.

19 Claims, 7 Drawing Sheets

INTEGRATED CIRCUIT AND BATTERY SYSTEM

CROSS-REFERENCE OF RELATED APPLICATIONS

The present invention claims priority of Chinese Patent Application No. 202211365572.0 filed in China on Oct. 31, 2022, the entire contents of which are incorporated herein by reference.

BACKGROUND OF THE INVENTION

Field of the Invention

The present invention relates to the field of battery management technology, and in particular to a chip and a battery system.

Description of the Related Art

For a battery pack with multiple battery cells coupled in series to obtain a higher battery output voltage, due to capacity mismatch and different aging among the battery cells, the longer the battery pack is used, the greater a voltage difference among the batter cells will be. The voltage difference among the batter cells may cause an effective battery capacity of the battery pack to become lower. For example, during charging, the battery cell with the highest voltage in the battery pack triggers a charging overvoltage protection first, so all the battery cells coupled in series cannot be charged and other battery cells cannot be fully charged. During discharging, the battery cell with the lowest voltage in the battery pack triggers a discharging overvoltage protection first, so all the battery cells coupled in series cannot be discharged.

The worst case is that: the voltage difference among the battery cells is very large, so that the voltage of one battery cell in the battery pack is so low as to be close to a discharge overvoltage protection threshold, while the voltage of another battery cell is so high as to be close to a charge overvoltage protection threshold. This kind of battery pack can neither be effectively charged nor discharged, essentially discarded as expired. Therefore, in order to better utilize the battery pack, it is necessary to manage power of each battery cell. For example, a circuit for balancing the power of each of the battery cells coupled in series can be designed in a battery protection chip, but balanced discharging will generate a lot of heat, so that heat dissipation in the battery protection chip becomes a bottleneck to limit an upper limit of a balanced discharge current.

SUMMARY OF THE INVENTION

Among others, one purpose of the present invention is to provide a chip and a battery system, which can accurately detect a voltage of each of the battery cells, facilitate heat dissipation, increase an upper limit of a balanced discharge current, and be convenient for users to adjust the balance discharge current.

To achieve the purpose, according to one aspect of the present invention, an integrated circuit (IC) is provided. The IC or chip comprises a balanced discharge circuit, where the balanced discharge circuit comprises: a plurality of switches, each coupled to two terminals of one of a plurality of battery cells coupled in series through a resistor outside the chip, and a control circuit coupled to two terminals of each of the switches, and configured to detect a voltage of each of the battery cells when all the switches are turned off, and then determine whether to control each of the switches to be turned on according to the detected voltage of corresponding battery cell.

According to another aspect of the present invention, a battery system is provided. The battery system comprises: a plurality of battery cells coupled in series; a plurality of resistors each corresponding to one of the battery cells; and a chip. The chip comprises a balanced discharge circuit. The balanced discharge circuit comprises: a plurality of switches, each switch configured to be coupled to two terminals of one of a plurality of battery cells coupled in series through one corresponding resistor outside the chip; a control circuit configured to be coupled to two terminals of each of the switches, detect a voltages of each of the battery cells when the switches are turned off, and then determine whether to control each of the switches to be turned on according to the voltage of corresponding battery cell.

In the present invention, the control circuit detects the voltages of each of the battery cells when all the switches are turned off, so the chip can accurately detect the voltage of each of the battery cells. Since the resistors are set outside the chip, so that the heat dissipation is conveniently provided, and the chip in the present invention can increase an upper limit of a balanced discharge current. At the same time, it is possible for users to adjust the balance discharge current by adjusting the resistances of the resistors.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
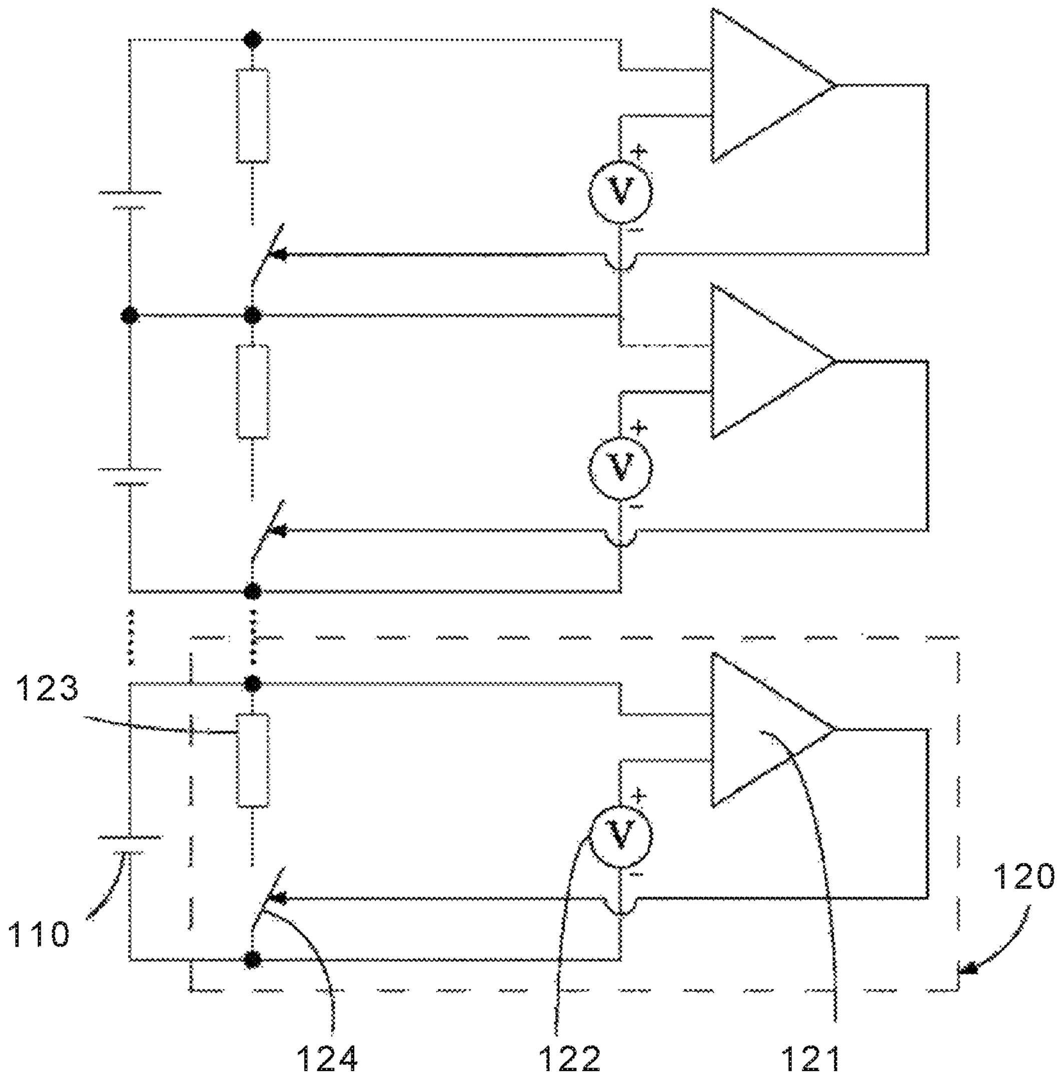
FIG. 1 is a schematic diagram of a passive balance circuit.

FIG. 1 is a schematic diagram of a passive balance circuit. As shown in FIG. 1, the passive balance circuit comprises a plurality of battery cells 110 coupled in series and a plurality of balance units 120. Each battery cell 110 is coupled to a corresponding balance unit 120. Each balance unit 120 comprises a comparator 121, a balance starting voltage source 122, a balance resistor 123, and a switching element 124.

One input of the comparator 121 is electrically coupled to the corresponding battery cell 110 to detect a voltage of the corresponding battery cell 110, and another input thereof is electrically coupled to the balance starting voltage source 122 so as to compare the voltage of the corresponding battery cell 110 with a balance starting voltage provided by the balance starting voltage source 122 to generate a control signal.

The balance resistor 123 and the switching element 124 are coupled in series to a positive terminal and a negative terminal of the corresponding battery cell 110 to form an balance loop, and the switching element 124 is further coupled to an output terminal of the comparator 121 to receive the control signal generated by the comparator 121 to determine whether the switching element 124 is turned on or not according to the control signal. That is, whether the balance loop formed by the balance resistor 123 and the switching element 124 performs a balance operation on the corresponding battery cell 110 is determined according to the control signal.

During a charging process, the comparator 121 in the balance unit 120 detects the voltage of the corresponding battery cell 110 and compares it with the balance starting voltage provided by the balance starting voltage source 122. If the detected voltage of the corresponding battery cell 110 is higher than the balance starting voltage, the control signal from the comparator 121 controls the switching element 124 to be turned on, and the balance loop formed by the balance resistor 123 and the switching element 124 is turned on, so that the corresponding battery cell 110 is discharged by the balancing resistor 123 to consume the power of the corresponding battery cell 110. In other words, for each battery cell 110 in a battery pack, during the charging process, the battery cell 110 with a higher power state reaches the balance starting voltage earlier, and its corresponding balance loop is turned on for a longer time, and the more power is consumed, thereby achieving the purpose of balancing the power of each battery cell 110 in the battery pack.

The above-described scheme has the following problems: (1) The redundant power in each battery cell 110 in the passive balance circuit will be consumed by corresponding balance resistor 123, so the passive balance circuit will emit a large amount of heat during operation. Especially, when the voltages of a large number of battery cells 110 in the passive balance circuit are higher than the balance starting voltage provided by the balance starting voltage source 122 and it is necessary to perform the balance operation on them, then the amount of heat emitted will increase accordingly, and the problem of heat dissipation is more serious. Therefore, the balance current of the passive balance circuit cannot be too large, and its balance capability is limited. (2) The balance resistor 123 and the switching element 124 coupled in series are coupled to two terminals of the battery cell 110, and the two inputs of the comparator 121 are coupled in parallel with the balance resistor 123 and the switching element 124, so that one control signal output by the output terminal of the comparator 121 controls the one switch element 124 to be turned on or off, i.e., the switching elements 124 in the different balance units are independently controlled, resulting in the inaccurate battery voltage detection results. In addition, if the voltages of all the battery cells are higher than the balance starting voltage, all the switching elements 124 are turned on, and all the battery cells perform the balancing discharge, resulting in energy waste and high heat generation.

In view of this, the present invention provides a chip and a battery system. In the chip and the battery system, a plurality of resistors for limiting a balance discharge current are externally arranged, and only switches for balanced discharge are integrated on the chip, so that heat dissipation is facilitated, an upper limit of the balanced discharge current is increased, and a user can conveniently adjust the balance discharge current by adjusting resistance of each of the resistors. In addition, a control circuit only detects a voltage drop on each of the switches for balanced discharge, i.e., the voltage between a drain electrode and a source electrode of each of the switches is sampled directly. When the voltage of each of the battery cell is detected, the switches which affect detection result of the voltage of each of the battery cells can be prohibited from being turned on, so as to ensure that the accurate voltage of each of the battery cells is detected.

Figure 2A:
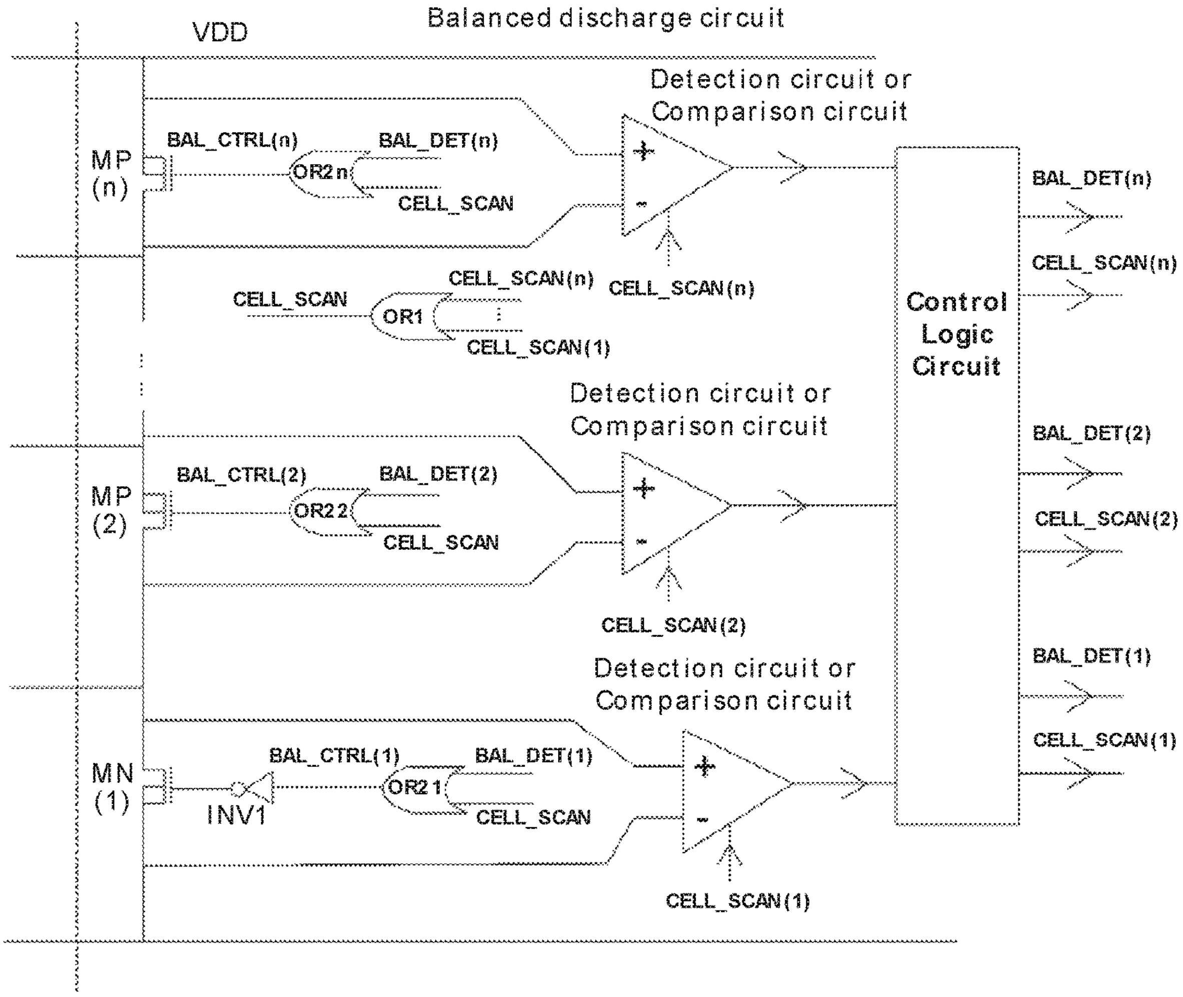
FIG. 2A is a schematic circuit diagram of a chip provided according to a first embodiment of the present invention.

FIG. 2A is a schematic circuit diagram of a chip provided according to a first embodiment of the present invention. As shown in FIG. 2A, the chip comprises a chip (not shown) and a balanced discharge circuit (a circuit on a right side of a dotted line shown in the FIG. 2A) provided in the chip. The balanced discharge circuit comprises a control circuit and a plurality of switches. In FIG. 2A, it is exemplarily shown that the switches comprise MN(1), MP(2) . . . MP(n). Each of the switches coupled with a resistor outside the chip in series is coupled to two terminals of one of a plurality of battery cells coupled in series.

In one embodiment, the control circuit comprises a control logic circuit, a logic operation circuit, and a plurality of detection circuits or comparison circuits. The logic operation circuit may comprise a first OR gate OR1 and a plurality of second OR gates such as OR21, OR22 . . . OR2*n*, wherein n is a natural number greater than or equal to 2. The control circuit is coupled to two terminals of each switch. For example, two terminals of each switch are coupled with one of the detection circuits or the comparison circuits. The control circuit is configured for detecting the voltage of each of the battery cells coupled with the disconnected switches when all the switches are turned off, and further determining whether to control each of the switches to be turned on according to the detected voltage of corresponding battery cell, so as to perform a balanced discharge on each of the battery cells.

In the above-described scheme, each switch is coupled to two terminals of one of the battery cells coupled in series through the resistor outside the chip, and the control circuit coupled to two terminals of each of the switches. When the voltage of the battery cell is detected, the switches which affect detection result of the voltage of the battery cell can be turned off, so as to ensure that the accurate voltage of the battery cell is detected. Since the resistors are set outside the chip, so that heat dissipation is facilitated, an upper limit of a balanced discharge current is increased. At the same time, it is convenient for users to adjust the balance discharge current by adjusting the resistances of the resistors.

The control circuit may also comprise a first inverter INV1. A lowermost switch is grounded and may be an NMOS transistor, a control terminal of the lowermost switch is coupled to an output terminal of the first inverter INV1, and an input terminal of the first inverter INV1 is configured to receive a control signal BAL_CTRL(1) sent by the control circuit. An uppermost switch may be a PMOS transistor. The switches located between the uppermost switch and the lowermost switch are one of the NMOS transistor, the PMOS transistor, and a combination of the NMOS transistor and the PMOS transistor.

In other words, the type of the switches in the balanced discharge circuit on the chip can be selected as follows:

(1) When the PMOS transistor is selected as the switch corresponding to the uppermost battery cell, the control circuit is relatively simple. If a charge pump is not configured to pump the voltage above VDD, a highest voltage of the control signal within the chip is VDD potential. If the uppermost switch uses the NMOS transistor, there must be a voltage drop greater than Vth across the uppermost switch because the conduction of the uppermost switch requires VGS>Vth, and the voltage drop multiplied by the balanced discharge current will cause a large amount of on-chip heating. Therefore, the switch corresponding to the uppermost battery cell selects the PMOS transistor which is conducted when a gate thereof is coupled to a low potential.

(2) The NMOS transistor is selected as the switch corresponding to the lowermost battery cell. Unless the charge pump is used internally to generate a negative potential lower than a ground potential, if the PMOS transistor is used as the switch corresponding to the lowermost battery cell, the PMOS switch will bear a voltage drop greater than Vth when it is turned on, resulting in a large amount of on-chip heating. Therefore, the switch corresponding to the lowermost battery cell selects the NMOS transistor, and it is possible to output a high potential to a gate of the NMOS switch by logic conversion, such as the first inverter INV1 when the NMOS switch is turned on.

(3) The switches for balance discharge corresponding to the intermediate battery cells can use one of the NMOS transistor, the PMOS transistor, and a combination of the NMOS transistor and the PMOS transistor. At the same time, it is necessary to select corresponding control logic according to the type of the switch.

Figure 2B:
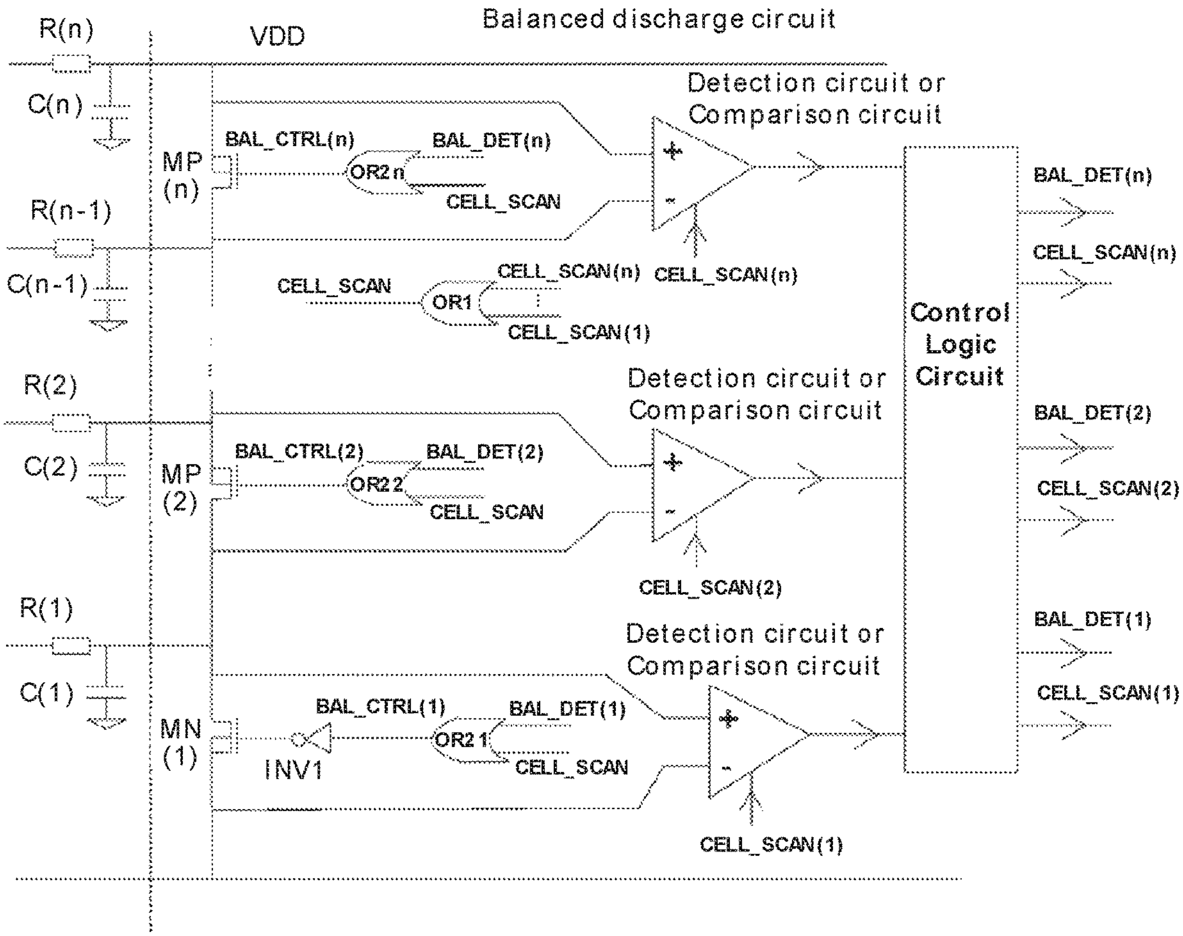
FIG. 2B is a schematic circuit diagram of a variation of the chip shown in FIG. 2A.

FIG. 2B is a schematic structural diagram of a variant of the chip shown in FIG. 2A. The chip shown in FIG. 2B is different from the chip shown in FIG. 2A in that the chip shown in FIG. 2B may further comprises a peripheral circuit, i.e., a circuit on a left side of the dotted line. The peripheral circuit comprises a plurality of resistors such as R(1), R(2) . . . R(n−1), R(n). The resistors R(1), R(2) . . . R(n−1), R(n) are coupled to the switches such as MN(1), MP(2) . . . MP(n) in series respectively as shown in FIG. 2B.

In the chips shown in FIGS. 2A and 2B, in order to reduce the number of pins of the chip (i.e., the number of wires extending from the right side of the dotted line to the left side of the dotted line), the switches such as MN(1), MP(2) . . . MP(n) may be coupled in series. One terminal of the switches coupled in series is grounded and coupled with a first terminal (such as a negative terminal of a battery pack formed by the battery cells) of the battery cells coupled in series, and the other terminal of the switches coupled in series is coupled with a second terminal (such as a positive terminal of the battery pack formed by the battery cells) of the battery cells coupled in series. One terminal of each switch away from the ground is coupled to a positive terminal of corresponding battery cell through the resistor. For example, one terminal of the switch MN(1) is grounded, the other terminal of the switch MN(1) away from the ground is coupled to the resistor R(1). The other terminal of the switch MP(2) away from the ground is coupled to the resistor R(2). In two adjacent switches, the resistor such as R(2) is coupled with an upper switch such as MP(2) in series, the resistor such as R(1) is coupled with the lower switch such as MN(1) in series, thus two resistors such as R(1), R(2) and the upper switch such as MP(2) are coupled in parallel to the two terminals of the battery cell corresponding to the upper switch such as MP(2). In addition, when the control circuit detects the voltage of each of the battery cell, the control circuit controls all the switches to be turned off.

Figure 4:
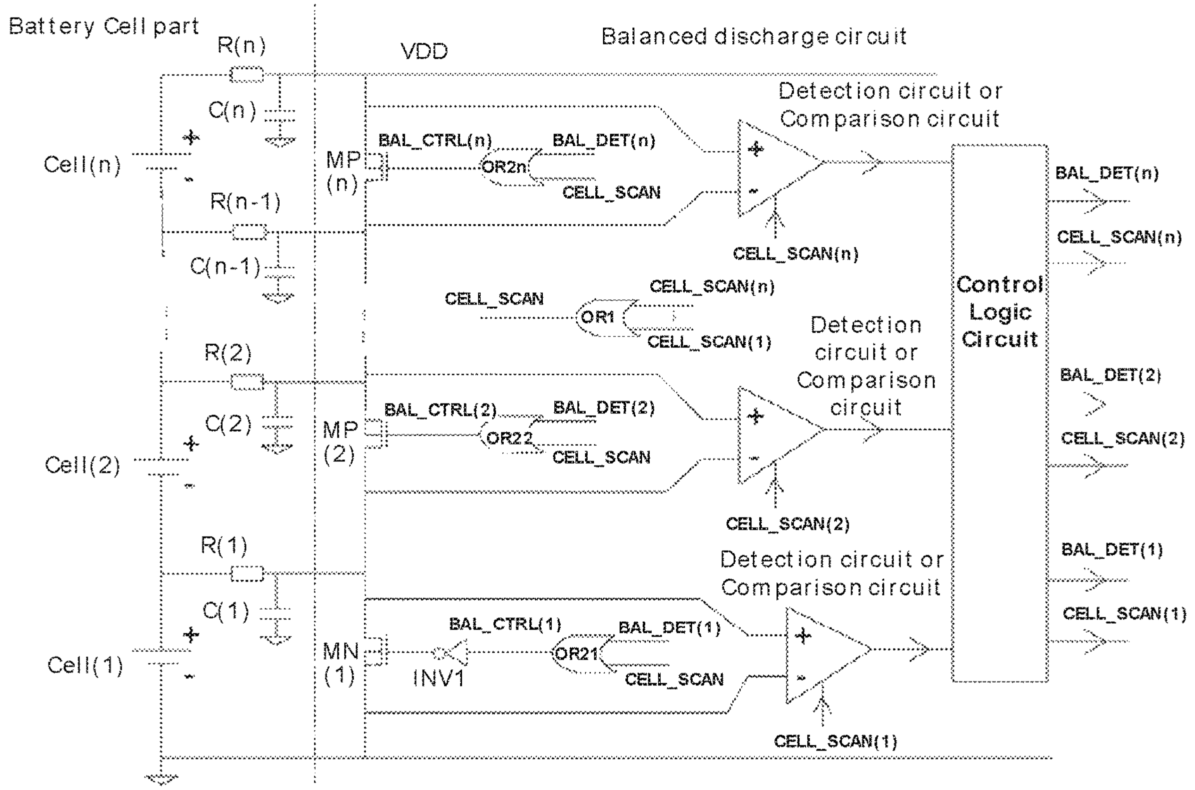
FIG. 4 shows a schematic circuit diagram of a battery system according to the first embodiment of the present invention.

For example, as shown in FIG. 4, R(1) is coupled with MN(1) in series, and then R(1) and MN(1) are coupled between the terminals of the battery Cell(1). MP(2) is coupled with R(2) and R(1) in series. MP(2), R(2) and R(1) may be coupled between the terminals of the battery Cell(2). MP(n) is coupled with R(n) and R(n−1) in series. MP(n), R(n) and R(n−1) may be coupled between the terminals of the battery Cell(n). The battery Cell(1), the battery Cell(2) . . . the battery Cell(n) are sequentially coupled in series.

Since the control circuit such as the detection circuit or the comparison circuit is coupled to the terminals of each switch, and a plurality of switches such as MN(1), MP(2) . . . MP(n) are coupled in series, such that the detected voltage of each battery cell is affected when the switches are turned on. In order to ensure that the detected voltage of the battery cell is accurate, it is necessary to turn off the switches when the voltage detection is performed. That is, the switches may have, but are not limited to, the following two cases:

The first case is that the switches are not coupled in series. The upper switch such as MP(2) is coupled in series with the resistor such as R(2), but not coupled in series with the resistor such as R(1) coupled to the lower switch such as MN(1). For example, MN1 coupled in series with R1 is coupled between the two terminals of the battery Cell (1); MP2 coupled in series with R2 is coupled between the two terminals of the battery Cell (2), and R1 is not coupled in series with R2 and MP2. Therefore, when the voltage of the battery cell is detected, only the switch corresponding to the battery cell that needs to be detected may be turned off.

The second case is that the switches are coupled in series. The upper switch such as MP(2) is connected in series with the resistor such as R(2), and the resistor such as R(1) coupled to the lower switch such as MN(1). For example, in FIG. 2B, MP2 (upper stage) coupled in series with R2 (upper stage) and R1 (lower stage) is coupled between the terminals of the battery Cell(2). Since the other switches also affects the detection result of the battery cell that needs to be detect, all the switches are turned off as long as one battery cell is required to be detected.

Further, as shown in FIG. 2B, in order to filter a power supply noise, the peripheral circuit may also comprise a plurality of capacitors. The capacitors correspond to the resistors one by one. One terminal of each of the capacitors is coupled to corresponding resistor, and the other terminal of each of the capacitors is grounded. In FIG. 2B, the capacitors are exemplarily shown to comprise C(1), C(2) . . . C(n−1), C(n). For example, one terminal of C(1) is coupled to one terminal of R(1), and the other terminal of C(1) is grounded; one terminal of C(2) is coupled to one terminal of R(2), and the other terminal of C(2) is grounded; one terminal of C(n−1) is coupled to one terminal of R(n−1), and the other terminal of C(n−1) is grounded; and one terminal of C(n) is coupled to one terminal of R(n), and the other terminal of C(n) is grounded.

Alternatively, the chip shown in FIG. 2A or 2B may be a battery protection chips having a battery protection circuit integrated therein. The battery protection circuit is configured to protect a plurality of battery cells coupled in series. The battery protection circuit herein may realize an overcharging protection, an overcurrent/short-circuit protection, and an over-discharge protection. In addition, the battery protection circuit may comprise a separate control logic circuit or may share the control logic circuit with the balance discharge circuit.

With continued reference to FIGS. 2A and 2B, the detection circuits or the comparison circuits may be coupled with the switches one by one. The control logic circuit is configured to output a plurality of first control signals CELL_SCAN(n). Each of the first control signals CELL_SCAN(n) is configured to represent whether corresponding battery cell is required to be detected by turning off corresponding switch. The control logic circuit is coupled to an output terminal of each of the detection circuits or the comparison circuits and is further for outputting a plurality of second control signals BAL_DET(n) based on the detected voltages outputted by the detection circuits or the comparison results outputted by the comparison circuits. Each of the second control signals BAL_DET(n) is configured for representing whether the detected voltage of corresponding battery cell is greater than the balanced discharge threshold voltage.

In one embodiment, the detection circuits are used. Each of the detection circuits is configured to detect the voltage of corresponding battery cell when all the switches are turned off, and then the control logic circuit may compare the voltage of the battery cell detected by the detection circuit with the balanced discharge threshold voltage and output a plurality of second control signals BAL_DET(n).

In another embodiment, the comparison circuits are used. The comparison circuit is configured to detect the voltage of corresponding battery cell coupled to the switch when all the switches are turned off, compares the voltage of the battery cell with the balanced discharge threshold voltage and output a comparison result. The control logic circuit may output a plurality of second control signals BAL_DET(n) based on the comparison results outputted by the comparison circuits.

In addition, each detection circuit or each comparison circuit may also receive a first control signal CELL_SCAN (n). Each of the first control signal CELL_SCAN(n) is configured to control whether the corresponding detection circuit or the corresponding comparison circuit works. The first control signal CELL_SCAN(n) may be a first logic level such as a logic high level or a second logic level such as a logic low level. When the first control signal CELL_SCAN(n) is the first logic level, it represents that corresponding battery cell is required to be detected, and the corresponding detection circuit or comparison circuit is enabled by the first control signal CELL_SCAN(n). When the first control signal CELL_SCAN(n) is the second logic level, it represents that corresponding battery cell is not required to be detected, and the corresponding detection circuit or comparison circuit is disenabled by the first control signal CELL_SCAN(n).

In one example, the comparison circuit may comprise a comparator. A first input of the comparator coupled to one terminal of the switch, a second input of the comparator coupled to another terminal of the switch, and a third input of the comparator receives the first control signal CELL_SCAN(n). The comparator is configured to compare a difference of the voltages inputted by the first input and the second input with the balanced discharge threshold voltage which is internally stored, and output the comparison result to the control logic circuit via the output terminal thereof.

In one embodiment, when the second control signal BAL_DET(n) is at a logic low level, it may represent that the voltage of corresponding battery cell is greater than the balance discharge threshold voltage. When the second control signal BAL_DET (n) is at a logic high level, it can represent that the voltage of corresponding battery cell is not greater than the balance discharge threshold voltage. When the voltage of one battery cell is greater than the balance discharge threshold and the voltages of all the battery cells do not require to be detected, the corresponding switch can be turned on for balance discharge (when the voltages of all the battery cell are greater than the balance discharge threshold, all the switches can be turned off). When the voltage of one battery cell is less than the balance discharge threshold or at least one battery cell requires to be detected, the corresponding switch is turned off.

For example, the logic operation circuit comprise a first OR gate OR1 and a plurality of second OR gates such as OR21, OR22, OR(2*n*). The logic operation circuit can be used for performing logic operation on at least one first control signal (such as at least one of CELL_SCAN(1), CELL_SCAN(2) . . . CELL_SCAN(n)) and at least one second control signal (e.g., BAL_DET(1), BAL_DET(2), BAL_DET (n)) to output at least one control signal (at least one of BAL_CTRL(1), . . . BAL_CTRL(n)). Each control signal (e.g. each of BAL_CTRL(1), . . . BAL_CTRL(n)) is configured to control the corresponding switching device to be turned off or on.

The first OR gate OR1 may comprise a plurality of inputs. The inputs of the first OR gate OR1 receives the first control signals CELL_SCAN(n), and an output of the first OR gate OR1 outputs a third control signal CELL_SCAN. The third control signal CELL_SCAN is configured to represent whether at least one of the battery cells is required to be detected, that is, all the switches are turned off. It should be noted that if at least one of the battery cells is required to be detected, all the switches will be turned off in the present invention. The first input terminal of each second OR gate such as OR21, OR22 . . . OR(2*n*) receives the second control signal BAL_DET(n), the second input terminal of each second OR gate receives the third control signal CELL_SCAN, and the output terminal of each second OR gate is configured to output the control signal BAL_CTRL(n) and is coupled to a control terminal of each of the switches.

In summary, in the first embodiment, if all the first control signals CELL_SCAN(n) represent that all the battery cell are not required to be detected and one second control signal BAL_DET(n) represents that the detected voltage of the battery cell corresponding to the one second control signal is greater than the balanced discharge threshold voltage, the switch corresponding to the one second control signal is turned on to perform a balanced discharge on the battery cell corresponding to the one second control signal. If the second control signals BAL_DET(n) represent that the detected voltages of all the battery cells are the less than the balanced discharge threshold voltage, or the first control signals represent that at least one of the battery cells is required to be detected, all the switches are turned off.

Figure 3A:
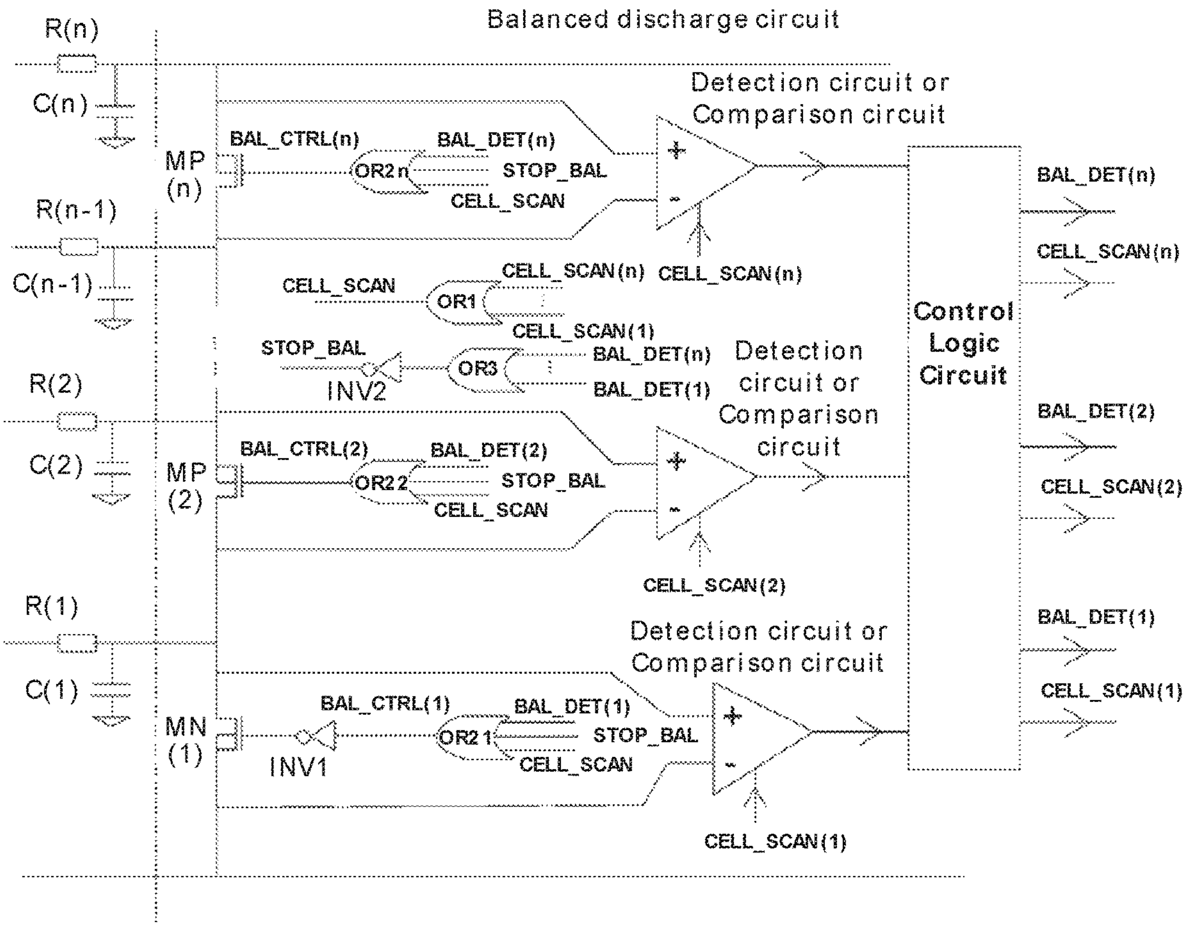
FIG. 3A is a schematic circuit diagram of the chip according to a second embodiment of the present invention.

FIG. 3A is a schematic circuit diagram of the chip according to a second embodiment of the present invention. A difference from the chip shown in FIG. 2A is that each second OR gate of the chip shown in FIG. 3A further comprises a third input. The third input of each second OR gate is configured to receive a fourth control signal STOP_BAL. The fourth control signal STOP_BAL represents whether it is true that all the battery cells are required to be discharged for balance, that is, whether it is true that the detected voltages of all the battery cells are higher than the balanced discharge threshold voltage.

The fourth control signal STOP_BAL is a logic high level in the case where it is true that all the battery cells are required to be discharged for balance. The fourth control signal STOP_BAL is a logic low level in the case where at least one of the battery cell is not required to be discharged for balance. The control circuit further comprises a third OR gate and a second inverter INV2. The third OR gate OR3 comprises a plurality of inputs and an output. The inputs of the third OR gate OR3 receive the second control signals BAL_DET(n) respectively, the output of the third OR gate OR3 is coupled to an input of the second inverter INV2, and an output of the second inverter INV2 is used for outputting the fourth control signal STOP_BAL. Therefore, the third OR gate OR3 and the second inverter INV2 function as follows: if the voltages of all the battery cells are higher than the balance threshold voltage, all the battery cells can no longer be discharge for balance, at this time all switches are turned off.

In other words, when the voltage of one battery cell is higher than the balance discharge threshold voltage, the corresponding switches need to be turned on for discharging. However, when the voltages of all the battery cells are higher than the balance threshold voltage, all the battery cells may no longer be discharge, and at this time, all the switches are turned off.

Figure 3B:
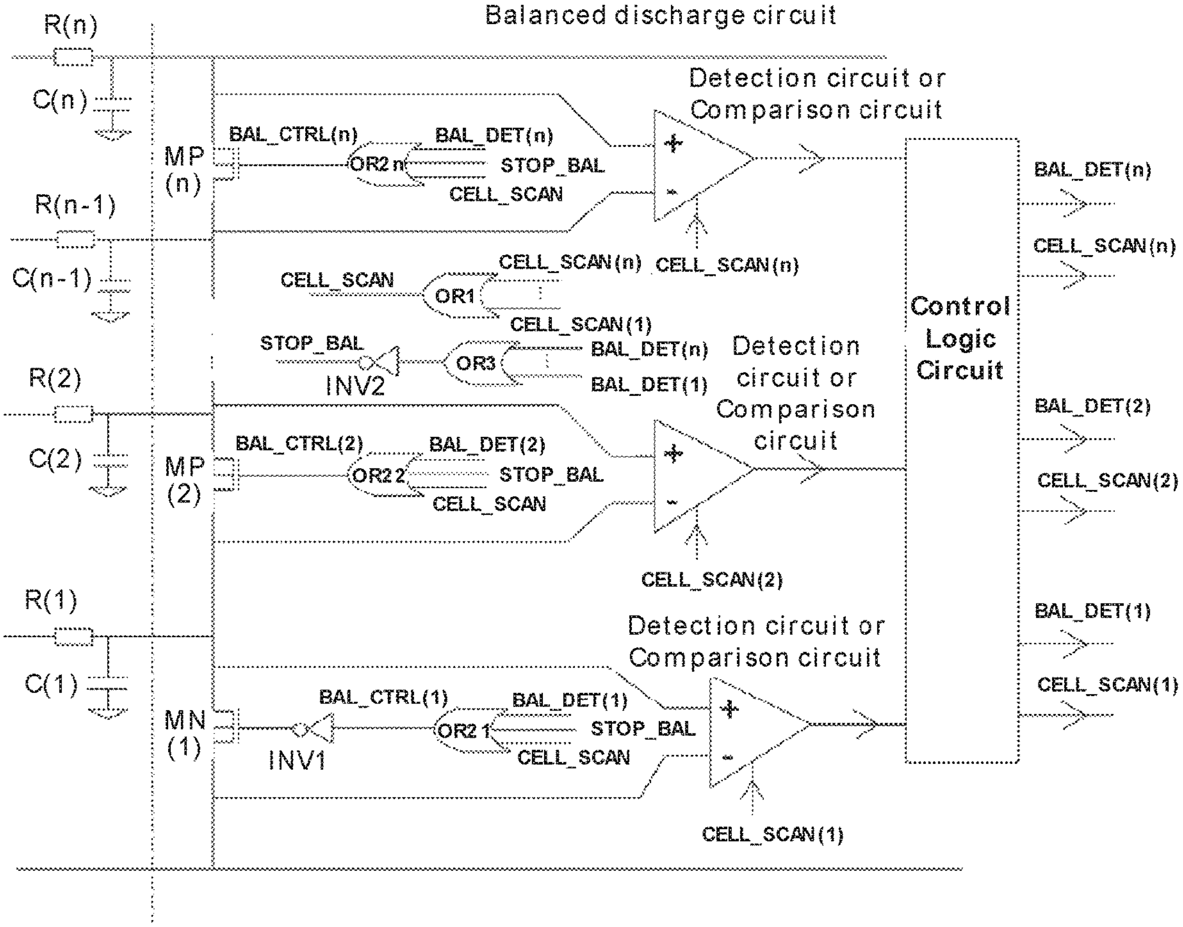
FIG. 3B is a schematic circuit diagram of a variant of the chip shown in FIG. 3A.

FIG. 3B is a schematic circuit diagram of a variant of the chip shown in FIG. 3A. The difference with the chip shown in FIG. 3A is that the chip shown in FIG. 3B also comprises a peripheral circuit. A description of the peripheral circuit can be found in a relevant portion of the embodiment shown in FIG. 2B.

In conjunction with the first embodiment shown in FIG. 2A and the second embodiment of FIG. 3A, it can be seen that if all the first control signals represent that all the battery cell are not required to be detected, one second control signal represents that the detected voltage of the battery cell corresponding to the one second control signal is greater than the balanced discharge threshold voltage, and it is not true that the detected voltages of all the battery cells are higher than the balanced discharge threshold voltage, the switch corresponding to the one second control signal is turned on to perform a balanced discharge on the battery cell corresponding to the one second control signal. If the second control signals represents that the detected voltages of all the battery cells are the less than the balanced discharge threshold voltage, the first control signals represent that at least one of the battery cells is required to be detected, or it is true that the detected voltages of all the battery cells are higher than the balanced discharge threshold voltage, all the switches are turned off.

FIG. 4 shows a schematic circuit diagram of a battery system according to the first embodiment of the present invention. As shown in FIG. 4, the battery system comprises a plurality of battery cells such as battery Cell(1), battery Cell(2) . . . battery Cell(n) coupled in series and the chip described according to the first embodiment. Each switch on the chip is coupled in series with at least one resistor outside the chip and then coupled to the two terminals of one of the battery cells coupled in series. If the chip is the chip shown in FIG. 2A, the battery system further comprises a peripheral circuit. The peripheral circuit comprises a plurality of resistors such as R(1), R(2) . . . R(n−1), R(n) and a plurality of capacitors such as C(1), C(2) . . . C(n−1), C(n).

With continued reference to FIG. 4, one terminal of the switches such as MN(1), MP(2) . . . MP(n) in series is grounded and coupled to a first terminal (I.e., the negative terminal of the battery pack formed by the battery cells) of the battery cells such as battery Cell(1), battery Cell(2) . . . battery Cell(n) coupled in series, and the other terminal of the switches such as MN(1), MP(2) . . . MP(n) in series is coupled to the second terminal (I.e., the positive terminal of the battery pack formed by the battery cells) of the battery cells such as battery Cell(1), battery Cell(2) . . . battery Cell(n) in series.

Each of the detection circuit or the comparison circuit is coupled to two terminals of each switch and is configured to detect the voltage of the battery cell coupled to the disconnected switch when corresponding switch is turned off. The control circuit determines whether to control each of the switches to be turned on according to the detected voltage of corresponding battery cell, so as to perform balance discharge on the coupled battery cell.

Figure 5:
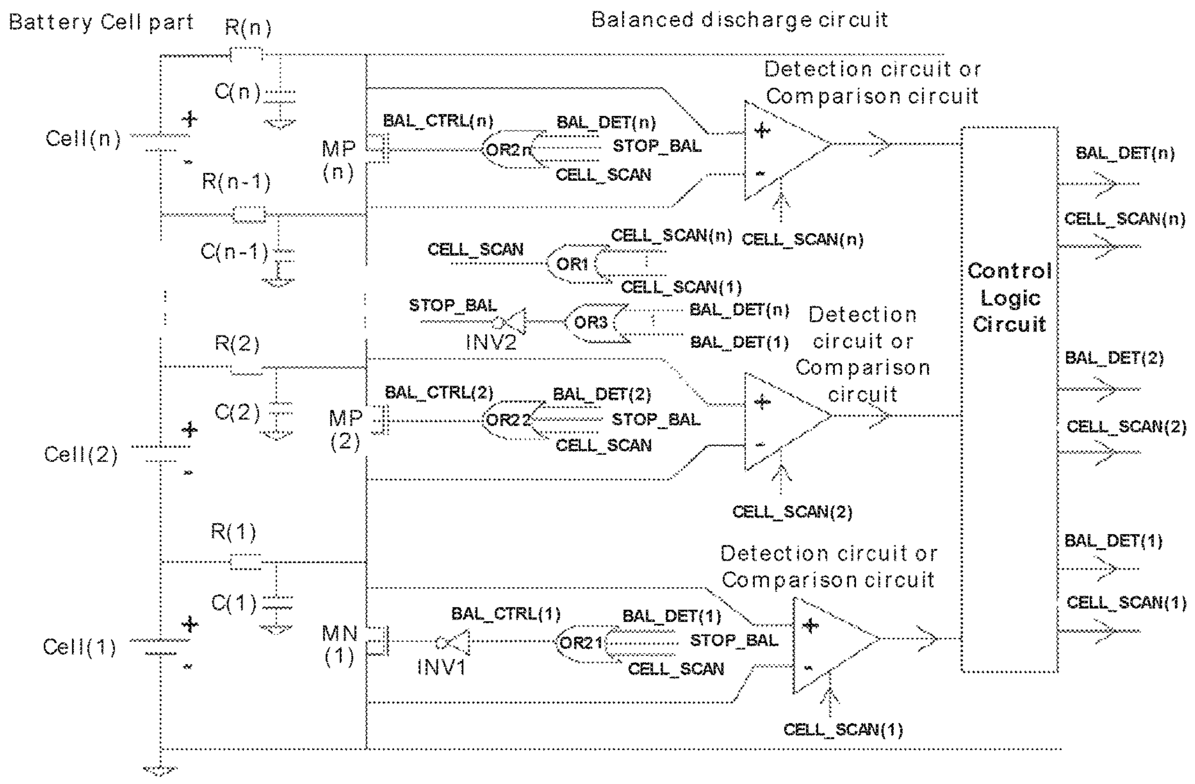
FIG. 5 shows a schematic circuit diagram of the battery system according to the second embodiment of the present invention.

FIG. 5 shows a schematic circuit diagram of the battery system according to the second embodiment of the present invention. As shown in FIG. 5, the battery system comprises a plurality of battery cells such as battery Cell(1), battery Cell(2) . . . battery Cell(n) coupled in series and the chip described according to the first embodiment. Each switch on the chip is coupled in series with at least one resistor outside the chip and then coupled to the two terminals of one of the battery cells coupled in series. If the chip is the chip shown in FIG. 3A, the battery system further comprises a peripheral circuit. The peripheral circuit comprises a plurality of resistors such as R(1), R(2) . . . R(n−1), R(n) and a plurality of capacitors such as C(1), C(2) . . . C(n−1), C(n).

In FIGS. 4 and 5, the battery system comprising n battery cells coupled in series is exemplarily shown. The circuit outside the chip is illustrated on the left side of the dotted line and the circuit inside the chip is illustrated on the right side of the dotted line. MN(1) is the balanced-discharge switch for the first battery Cell(1), MP(2) is the balanced-discharge switch for the second battery Cell(2), and MP(n) is the balanced-discharge switch for the uppermost battery Cell(n).

As shown in FIG. 4, a voltage sampling and detection module, i.e., the detection circuit or the comparison circuit, detects the voltage between the source and the drain of each of the balanced discharge switch. CELL_SCAN(n) as an enable signal (high enable) controls the voltage sampling and detection module to work.

The control logic circuit output the signal CELL_SCAN (n) to determine when to detect the voltage of the battery cell (n), and outputs the signal BAL_DET(n) to determine whether to perform balanced discharge on the nth battery cell according to the result, relative to the voltage of the nth battery cell, output by the voltage sampling and detection module. For example, when BAL_DET(n) is logic low, it represents that the control logic circuit determines that the nth battery cell requires to be discharged for balance.

CELL_SCAN is the logic OR of all CELL_SCAN(n). That is, as long as the chip detects the voltage of any one of the battery cells, CELL_SCAN is logic high, and all the switches will be turned off.

BAL_CTRL(n) is a signal for controlling the balance discharge switch. When the BAL_CTRL(n) is logic high, the balance discharge is prohibited, and when the BAL_CTRL (n) is logic low, the balance discharge is allowed. This signal BAL_CTRL(n) is the logical OR of BAL_DET(n) and CELL_SCAN. Therefore, as long as the CELL_SCAN is high, even if the BAL_DEL (n) is logic low, the BAL_CTRL (n) is high to prohibit the balance discharge. When only the balance discharge switch is built in the chip and a plurality of switches are coupled in series, the voltage detection of this battery cell will be distorted and the voltage detection of the adjacent battery cells will also be distorted when a certain battery cell is discharged. Therefore, when anyone of the battery cells is detected, all the switches in the chip must be turned off to ensure that the real voltage of the battery cell is detected.

As shown in FIG. 5, when all BAL_DET(1)~BAL_DET (n) are low, the third OR gate OR3 outputs low, which is inverted by the second inverter INV2, and STOP_BAL is high, all the switches are forced to be turn off.

In summary, for the scheme in which the resistor for limiting the balanced discharge current and the switch are built into the chip, and the comparator detects the voltage drop sum on the resistor and the switch, heat dissipation in the chip become a bottleneck to limit the upper limit of the balanced discharge current. In the chip and the battery system of the present invention, the resistors for limiting the balanced discharge current are provided outside the chip, only the switches for balance discharge are integrated in the chip, and the comparator is coupled to two terminals of each of the switch, so that all the switches are turned off when the voltage of the battery cell is detected to ensure that an accurate voltage of the battery cell is detected. At the same time, the heat source such as the resistors of the balance discharge path is placed outside of the chip when the balance discharge occurs, so that the upper limit of the balance discharge current can be increased. At the same time, it is convenient for users to adjust the balance discharge current by adjusting the resistances of the resistors.

Although preferred embodiments of the present invention have been described, additional changes and modifications to these embodiments may be made once the basic creative concepts are known to those skilled in the art. The appended claims are therefore intended to be interpreted to comprise preferred embodiments and all changes and modifications falling within the scope of this application.

Obviously, a person skilled in the art may make various changes and variations to the application without departing from the spirit and scope of the application. Thus, if these modifications and variations of this application fall within the scope of the claims and their equivalent technologies, the application is also intended to comprise these changes and variations.

What is claimed is:

1. A chip comprising:

a balanced discharge circuit including:

a plurality of switches, each switch coupled to two terminals of one of a plurality of battery cells coupled in series through a resistor located externally to the chip; and a control circuit coupled to two terminals of each of the switches, and configured to detect a voltage of each of the battery cells when all the switches are turned off, and then determine whether to control each of the switches to be turned on according to the detected voltage of corresponding battery cell.

2. The chip according to claim 1, wherein if the detected voltage of one battery cell is greater than a balanced discharge threshold voltage and all the battery cells are not required to be detected, the switch corresponding to the one battery cell whose voltage is greater than the balanced discharge threshold voltage is turned on to perform a balanced discharge on the one battery cell, and if the detected voltages of all the battery cells are the less than the balanced discharge threshold voltage or at least one of the battery cells is required to be detected, all the switches are turned off.

3. The chip according to claim 1, wherein if the detected voltage of one battery cell is greater than a balanced discharge threshold voltage, all the battery cells are not required to be detected and it is not true that the detected voltages of all the battery cells are higher than the balanced discharge threshold voltage, the switch corresponding to the one battery cell whose voltage is greater than the balanced discharge threshold voltage is turned on to perform a balanced discharge on the one battery cell, and if the detected voltages of all the battery cells are less than the balanced discharge threshold voltage, at least one of the battery cells is required to be detected, or it is true that the detected voltages of all the battery cells are higher than the balanced discharge threshold voltage, all the switches are turned off.

4. The chip according to claim 1, wherein one terminal of each switch is coupled to a positive terminal of corresponding battery cell through the resistor.

5. The chip according to claim 1, wherein the switches are coupled in series, a lowermost switch in series is an NMOS transistor, an uppermost switch in series is a PMOS transistor, and the switch located between the uppermost switch and the lowermost switch is one of the NMOS transistor, the PMOS transistor, and a combination of the NMOS transistor and the PMOS transistor.

6. The chip according to claim 1, wherein the control circuit further comprises:

a plurality of detection circuits or comparison circuits, each of the detection circuits or the comparison circuits coupled to the two terminals of one of the switches, wherein each of the detection circuits is configured to detect the voltage of corresponding battery cell when all the switches are turned off, and output the detected voltage of the corresponding battery cell, each of the comparison circuits is configured to detect the voltage of corresponding battery cell when all the switches are turned off, compare the detected voltage of the corresponding battery cell with a balanced discharge threshold voltage and output a comparison result, a control logic circuit configured for outputting a plurality of first control signals, each of the first control signals configured to represent whether corresponding battery cell is required to be detected, wherein the control logic circuit is coupled to an output terminal of each of the detection circuits or the comparison circuits and further configured for outputting a plurality of second control signals based on the detected voltages outputted by the detection circuits or the comparison result outputted by the comparison circuits, each of the second control signals is configured for representing whether the detected voltage of corresponding battery cell is greater than the balanced discharge threshold voltage;

a logic operation circuit configured for performing a logic operation on the first control signals and the second control signals to output a plurality of control signals, each of the control signals is configured for controlling corresponding switch to be turned on or off.

7. The chip according to claim 6, wherein if the first control signals represent that all the battery cell are not required to be detected and one second control signal represents that the detected voltage of the battery cell corresponding to the one second control signal is greater than the balanced discharge threshold voltage, the switch corresponding to the one second control signal is turned on to perform a balanced discharge on the battery cell corresponding to the one second control signal, if the second control signals represent that the detected voltages of all the battery cells are the less than the balanced discharge threshold voltage, or the first control signals represent that at least one of the battery cells is required to be detected, all the switches are turned off.

8. The chip according to claim 7, wherein if the first control signals represent that all the battery cell are not required to be detected, one second control signal represents that the detected voltage of the battery cell corresponding to the one second control signal is greater than the balanced discharge threshold voltage, and it is not true that the detected voltages of all the battery cells are higher than the balanced discharge threshold voltage, the switch corresponding to the one second control signal is turned on to perform a balanced discharge on the battery cell corresponding to the one second control signal, and if the second control signals represent that the detected voltages of all the battery cells are the less than the balanced discharge threshold voltage, the first control signals represent that at least one of the battery cells is required to be detected, or it is true that the detected voltages of all the battery cells are higher than the balanced discharge threshold voltage, all the switches are turned off.

9. The chip according to claim 1, wherein the chip is a battery protection chip with a battery protection circuit integrated therein, the battery protection circuit is configured to protect the battery cells coupled in series.

10. A battery system, comprising:

a plurality of battery cells coupled in series;

a plurality of resistors each corresponding to one of the battery cells; and a chip comprising a balanced discharge circuit, and the balanced discharge circuit including:

a plurality of switches each switch coupled to two terminals of one of a plurality of battery cells coupled in series through a resistor outside the chip; and a control circuit coupled to two terminals of each of the switches, and configured to detect a voltage of each of the battery cells when all the switches are turned off, and then determine whether to control each of the switches to be turned on according to the detected voltage of corresponding battery cell.

11. The battery system according to claim 10, wherein if the detected voltage of one battery cell is greater than a balanced discharge threshold voltage and all the battery cells are not required to be detected, the switch corresponding to the one battery cell whose voltage is greater than the balanced discharge threshold voltage is turned on to perform a balanced discharge on the one battery cell, and if the detected voltages of all the battery cells are the less than the balanced discharge threshold voltage or at least one of the battery cells is required to be detected, all the switches are turned off.

12. The battery system according to claim 10, wherein if the detected voltage of one battery cell is greater than a balanced discharge threshold voltage, all the battery cells are not required to be detected and it is not true that the detected voltages of all the battery cells are higher than the balanced discharge threshold voltage, the switch corresponding to the one battery cell whose voltage is greater than the balanced discharge threshold voltage is turned on to perform a balanced discharge on the one battery cell, and if the detected voltages of all the battery cells are less than the balanced discharge threshold voltage, at least one of the battery cells is required to be detected, or it is true that the detected voltages of all the battery cells are higher than the balanced discharge threshold voltage, all the switches are turned off.

13. The battery system according to claim 10, wherein one terminal of each switch is coupled to a positive terminal of corresponding battery cell through the resistor.

14. The battery system according to claim 10, wherein the switches are coupled in series, a lowermost switch in series is an NMOS transistor, an uppermost switch in series is a PMOS transistor, and the switch located between the uppermost switch and the lowermost switch is one of the NMOS transistor, the PMOS transistor, and a combination of the NMOS transistor and the PMOS transistor.

15. The battery system according to claim 10, wherein the control circuit further comprises:

a plurality of detection circuits or comparison circuits, each of the detection circuits or the comparison circuits coupled to the two terminals of one of the switches, wherein each of the detection circuits is configured to detect the voltage of corresponding battery cell when all the switches are turned off, and output the detected voltage of the corresponding battery cell, each of the comparison circuits is configured to detect the voltage of corresponding battery cell when all the switches are turned off, compare the detected voltage of the corresponding battery cell with a balanced discharge threshold voltage and output a comparison result;

a control logic circuit configured for outputting a plurality of first control signals, each of the first control signals configured to represent whether corresponding battery cell is required to be detected, wherein the control logic circuit is coupled to an output terminal of each of the detection circuits or the comparison circuits and further configured for outputting a plurality of second control signals based on the detected voltages outputted by the detection circuits or the comparison result outputted by the comparison circuits, each of the second control signals is configured for representing whether the detected voltage of corresponding battery cell is greater than the balanced discharge threshold voltage;

a logic operation circuit configured for performing a logic operation on the first control signals and the second control signals to output a plurality of control signals, wherein each of the control signals is configured for controlling corresponding switch to be turned on or off.

16. The battery system according to claim 15, wherein if the first control signals represent that all the battery cell are not required to be detected and one second control signal represents that the detected voltage of the battery cell corresponding to the one second control signal is greater than the balanced discharge threshold voltage, the switch corresponding to the one second control signal is turned on to perform a balanced discharge on the battery cell corresponding to the one second control signal, if the second control signals represent that the detected voltages of all the battery cells are the less than the balanced discharge threshold voltage, or the first control signals represent that at least one of the battery cells is required to be detected, all the switches are turned off.

17. The battery system according to claim 15, wherein if the first control signals represent that all the battery cell are not required to be detected, one second control signal represents that the detected voltage of the battery cell corresponding to the one second control signal is greater than the balanced discharge threshold voltage, and it is not true that the detected voltages of all the battery cells are higher than the balanced discharge threshold voltage, the switch corresponding to the one second control signal is turned on to perform a balanced discharge on the battery cell corresponding to the one second control signal, and if the second control signals represent that the detected voltages of all the battery cells are the less than the balanced discharge threshold voltage, the first control signals represent that at least one of the battery cells is required to be detected, or it is true that the detected voltages of all the battery cells are higher than the balanced discharge threshold voltage, all the switches are turned off.

18. The battery system according to claim 10, wherein the chip is a battery protection chip with a battery protection circuit integrated therein, the battery protection circuit is configured to protect the battery cells coupled in series.

19. The battery system according to claim 13, further comprising:

a plurality of capacitors each coupled to the positive terminal of corresponding battery cell through corresponding resistor.

* * * * *